US012580091B2

(12) United States Patent
Artman et al.

(10) Patent No.: US 12,580,091 B2
(45) Date of Patent: Mar. 17, 2026

(54) TECHNETIUM-99M GENERATOR COLUMN ASSEMBLY AND METHOD OF USE THEREOF

(71) Applicant: BWXT Isotope Technology Group, Inc., Lynchburg, VA (US)

(72) Inventors: Thomas Alan Artman, Forest, VA (US); Kenneth Raymond Palazzi, Lynchburg, VA (US)

(73) Assignee: BWXT Isotope Technology Group, Inc., Lynchburg, VA (US)

( * ) Notice: Subject to any disclaimer, the term of this patent is extended or adjusted under 35 U.S.C. 154(b) by 272 days.

(21) Appl. No.: 18/203,979

(22) Filed: May 31, 2023

(65) Prior Publication Data

US 2023/0395276 A1 Dec. 7, 2023

Related U.S. Application Data

(60) Provisional application No. 63/348,625, filed on Jun. 3, 2022.

(51) Int. Cl.
*G21G 1/00* (2006.01)
*G21G 4/08* (2006.01)

(52) U.S. Cl.
CPC ............... *G21G 1/001* (2013.01); *G21G 4/08* (2013.01); *G21G 2001/0042* (2013.01)

(58) Field of Classification Search
CPC ... G21G 1/001; G21G 4/08; G21G 2001/0042
See application file for complete search history.

(56) References Cited

U.S. PATENT DOCUMENTS

| | | | | |
|---|---|---|---|---|
| 3,446,965 | A * | 5/1969 | Groves | G21F 7/068 976/DIG. 374 |
| 4,093,697 | A | 6/1978 | Hadi et al. | |
| 4,782,231 | A | 11/1988 | Svoboda et al. | |
| 5,809,394 | A | 9/1998 | Bray et al. | |
| 9,240,253 | B2 | 1/2016 | Varnedoe et al. | |

(Continued)

FOREIGN PATENT DOCUMENTS

| | | | |
|---|---|---|---|
| CA | 3192521 | A1 | 3/2022 |
| WO | 2022/183204 | A1 | 9/2022 |

OTHER PUBLICATIONS

International Preliminary Report on Patentability, PCT/2023/024142, dated Nov. 7, 2024, 7 pages.

(Continued)

*Primary Examiner* — Nicole M Ippolito
(74) *Attorney, Agent, or Firm* — Nelson Mullins Riley & Scarborough LLP

(57) ABSTRACT

A generator column assembly for the elution of a radioisotope, having a generator column container having a bottom wall defining a flow outlet aperture, an open top end, and a sidewall extending from the open top end to the bottom wall that defines an interior volume having a substantially cylindrical upper volume portion and a substantially cylindrical lower volume portion, the upper volume portion having a diameter that is greater than a diameter of the lower volume portion, and a closure cap assembly including a substantially cylindrical container cap defining a flow inlet aperture, the container cap being configured to be slidably received in the open top end of the generator column container.

20 Claims, 15 Drawing Sheets

(56) References Cited

U.S. PATENT DOCUMENTS

| | | | | |
|---|---|---|---|---|
| 11,832,374 | B1 * | 11/2023 | Ripley | G21G 1/001 |
| 12,002,596 | B2 | 6/2024 | Czerwinski et al. | |
| 2006/0153760 | A1 | 7/2006 | Meikrantz et al. | |
| 2012/0305429 | A1 * | 12/2012 | Mayfield | G21F 5/12 206/438 |
| 2013/0029073 | A1 * | 1/2013 | Mayfield | A61J 1/2089 428/34.1 |
| 2015/0292061 | A1 | 10/2015 | Fassbender et al. | |
| 2015/0315442 | A1 | 11/2015 | Hofius | |
| 2016/0209387 | A1 | 7/2016 | Hjellum | |
| 2017/0202983 | A1 | 7/2017 | Birnbaum et al. | |
| 2018/0180585 | A1 | 6/2018 | Hjellum | |
| 2019/0043630 | A1 * | 2/2019 | Fisher | G21C 23/00 |
| 2021/0027905 | A1 | 1/2021 | Robertson et al. | |
| 2021/0327602 | A1 | 10/2021 | Brown et al. | |
| 2022/0200522 | A1 | 6/2022 | de Fresart et al. | |
| 2022/0215979 | A1 | 7/2022 | Kim et al. | |
| 2023/0390730 | A1 | 12/2023 | Wiggins et al. | |
| 2024/0219592 | A1 | 7/2024 | Oelsner | |
| 2024/0221968 | A1 | 7/2024 | Causey et al. | |

OTHER PUBLICATIONS

International Preliminary Report on Patentability, PCT/IB2023/000799, dated Jul. 1, 2025, 7 pages.

International Preliminary Report on Patentability, PCT/US2023/24141, dated Nov. 7, 2024, 7 pages.

International Search Report and Written Opinion, PCT/2023/024142, dated Aug. 30, 2023, 9 pages.

International Search Report and Written Opinion, PCT/IB2023/000799, dated Aug. 2, 2024, 10 pages.

International Search Report and Written Opinion, PCT/IB2023/000800, dated Jun. 7, 2024, 7 pages.

International Search Report and Written Opinion, PCT/US2023/035301, dated Feb. 21, 2024, 10 pages.

International Search Report and Written Opinion, PCT/US2023/24141, dated Aug. 30, 2023, 7 pages.

Mastren, T. et al., "Simultaneous Separation of Actinium and Radium Isotopes from a Proton Irradiated Thorium Matrix," Scientific Reports, vol. 7 (1):8216 (2017).

McAlister, D. et al., "Selective separation of radium and actinium from bulk thorium target material on strong acid cation exchange resin from sulfate media," Applied Radiation and Isotopes, vol. 140: 18-23 (2018).

Robertson, A. et al. "232Th-Spallation-Produced 225Ac with Reduced 227Ac Content," Inorganic Chemistry, vol. 59 (17): 12156-65 (Abstract only) (2020).

Keshavarz, A et al., "Preparation of nanocrystalline γ-Al2O3 catalyst using different procedures for methanol dehydration to dimethyl ether," Journal of Natural Gas Chemistry, vol. 20: 334-338 (2011).

Sathyaseelan, B. et al., Phas Transition Behaviour of Nanocrystalline Al2O3 Powders, Soft Nanoscience Letters, vol. 3: 69-74 (2013).

Chakravarty, R. et al., "Preparation of clinical-scale99 Mo/ 99m Tc col. generator using neutron activated low specific activity99 Mo and nanocrystalline γ-Al203 as column matrix," Nuclear Medicine and Biology, vol. 39:916-922 (2012).

Chakravarty, R. et al., "Exploitation of Nano Alumina for the Chromatographic Separation of Clinical Grade188 Re from188 W: A Renaissance of the 188 W/ 188 Re Generator Technology," Anal. Chem., vol. 83: 6342-6348 (2011).

Guedes-Silva, C. et al., "Influence of Alumina Phases on the Molybdenum Adsorption Capacity and Chemical Stability for 99Mo/99mTc Generators Columns," Materials Research, vol. 19(4): 791-794 (2016).

Denkova, A. et al., "Adsorption of Molybdenum on Mesoporous Aluminum Oxides for Potential Application in Nuclear Medicine," Separation Science and Technology, 48:9, 1331-133 (2013).

* cited by examiner

TECHNETIUM-99M GENERATOR COLUMN ASSEMBLY AND METHOD OF USE THEREOF

CROSS-REFERENCE TO RELATED APPLICATIONS

This application claims priority from U.S. Provisional Patent Application No. 63/348,625 filed on Jun. 3, 2022, in the United States Patent and Trademark Office. The disclosure of which is incorporated herein by reference in its entirety.

FIELD OF THE INVENTION

The present invention relates to a system and method of using an alumina as a guard filter in a Molybdenum/Technetium 99-m (Mo-99/Tc-99m) generator and, more particularly, to using an alumina as a guard filter in a Molybdenum/Technetium 99-m generator having a metal-molybdate containing powder.

BACKGROUND OF THE INVENTION

Technetium-99m (Tc-99m) is the most commonly used radioisotope in nuclear medicine (e.g., medical diagnostic imaging). Tc-99m (m is metastable) is typically injected into a patient which, when used with certain equipment, is used to image the patient's internal organs. However, Tc-99m has a half-life of only about six (6) hours. As such, readily available sources of Tc-99m are of particular interest and/or need in the nuclear medicine field.

Given the short half-life of Tc-99m, Tc-99m is typically obtained at the location and time of need (e.g., at a pharmacy, hospital, etc.) via a Mo-99/Tc-99m generator. Mo-99/Tc-99m generators are devices used to extract, or elute, the metastable isotope of technetium (i.e., Tc-99m) from a source of decaying molybdenum by passing saline through the Mo material. Mo-99 is unstable and decays with about a 66-hour half-life to Tc-99m. Mo-99 is typically produced in a high-flux nuclear reactor from the irradiation of highly-enriched uranium targets (93% Uranium-235) and shipped to Mo-99/Tc-99m generator manufacturing sites.

Mo-99/Tc-99m generators are then distributed from these centralized locations to hospitals, pharmacies, etc., throughout the country. The number of production sites and available high flux nuclear reactors are limited and, as such, the supply of Mo-99 is susceptible to frequent interruptions and shortages resulting in delayed nuclear medicine procedures.

Molybdenum, in both the radiological and chemical form, is considered a contaminant in the eluate. The Mo-99/Tc-99m generators currently on the market may use an aluminum oxide sorbent (Brockmann I alumina sorbent) with the chemical structure of $\alpha$-$Al_2O_3$. If Mo-99 is pulled into the eluate along with the sodium pertechnetate, Mo-99 has broken through the ion/anion separation process. It is important to block the draw of Mo-99 into the solution that is tagged to a pharmaceutical drug for injection into the human body. If unmitigated, Mo-99 could expose patients to potentially high and unnecessary doses of radiation.

The conventional way to produce a Mo-99/Tc-99m generator is to sorb a high specific activity and acidic liquid molybdate onto an alumina column. With conventional generators, the molybdate species is doubly negatively charged (−2) and when Mo-99 decays the Tc-99m daughter is singly negatively charged and is not bound (or sorbed) to the $Al_2O_3$ and can be eluted off with the saline solution that traverses the $Al_2O_3$ column. FIG. 11 illustrates a prior art conventional Mo-99/Tc-99m generator. As shown, the prior art generator 10 includes a straight cylindrical column 12 of constant circular cross-section, a top cap 14 (or glass frit), a bottom cap 16, Mo-99 liquid deposited on a media bed 18 (typically alumina), and inlet flow and outlet flow ports 22 and 24. Most commercially available generators are made with fission-produced Mo-99 in liquid form that is injected into and absorbed in the media bed 18 for activation of the generator. The same ports utilized for activation of the generator with the radioactive liquid are the same ports that are later used by the end user during conditioning of the generator with saline to yield the Tc99m eluate.

When using traditional alumina sorbents from Mo-99/Tc-99m generator technology, the aluminum oxide sorbent typically requires an equal mass ratio of alumina to powder to adequately reduce the issue of Mo-99 breakthrough. When paired with existing Mo-99/Tc-99m generator technology noted above, various disadvantageous issues for the Mo-99/Tc-99m generators such as, but not limited to reduced elution efficiency, shielding with the alumina bed, high mass requirements, and greater size dimensions of the generator which lead to increased size and weight of protective shielding.

Thus, there is a need to find suitable alternatives to utilizing a standard column configuration to address Mo breakthrough and alleviate the above concerns when using a Molybdenum/Technetium-99m (Mo-99/Tc-99m) generator having a metal-molybdate containing powder material.

SUMMARY OF THE INVENTION

One embodiment of the present invention provides a generator column assembly for the elution of a radioisotope, including a generator column container having a bottom wall defining a flow outlet aperture, an open top end, a sidewall extending from the open top end to the bottom wall that defines an interior volume having a substantially cylindrical upper volume portion and a substantially cylindrical lower volume portion, the upper volume portion having a diameter that is greater than a diameter of the lower volume portion, and a flow outlet aperture, and a closure cap assembly including a substantially cylindrical container cap defining a flow inlet aperture, the container cap being configured to be slidably received in the open top end of the generator column container.

Another embodiment of the present invention provides a generator column assembly for the elution of a radioisotope, having a generator column container having a bottom wall defining flow outlet aperture, an open top end, and a sidewall extending from the open top end to the bottom wall that defines an interior volume, and a closure cap assembly including a substantially cylindrical container cap having a top wall defining a flow inlet aperture and a substantially cylindrical sidewall extending downwardly therefrom, the container cap being configured to be slidably received in the open top end of the generator column container, an annular coupling groove defined by an inner surface of the sidewall of the container cap, an elastomeric boot including an annular coupling ring, a body portion extending downwardly therefrom, and a substantially cylindrical base portion disposed at a bottom end of the body portion, wherein the annular coupling ring is disposed within the annular coupling groove.

The accompanying drawings, which are incorporated in and constitute a part of this specification, illustrate one or more embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended drawings, in which.

Figure 1A:
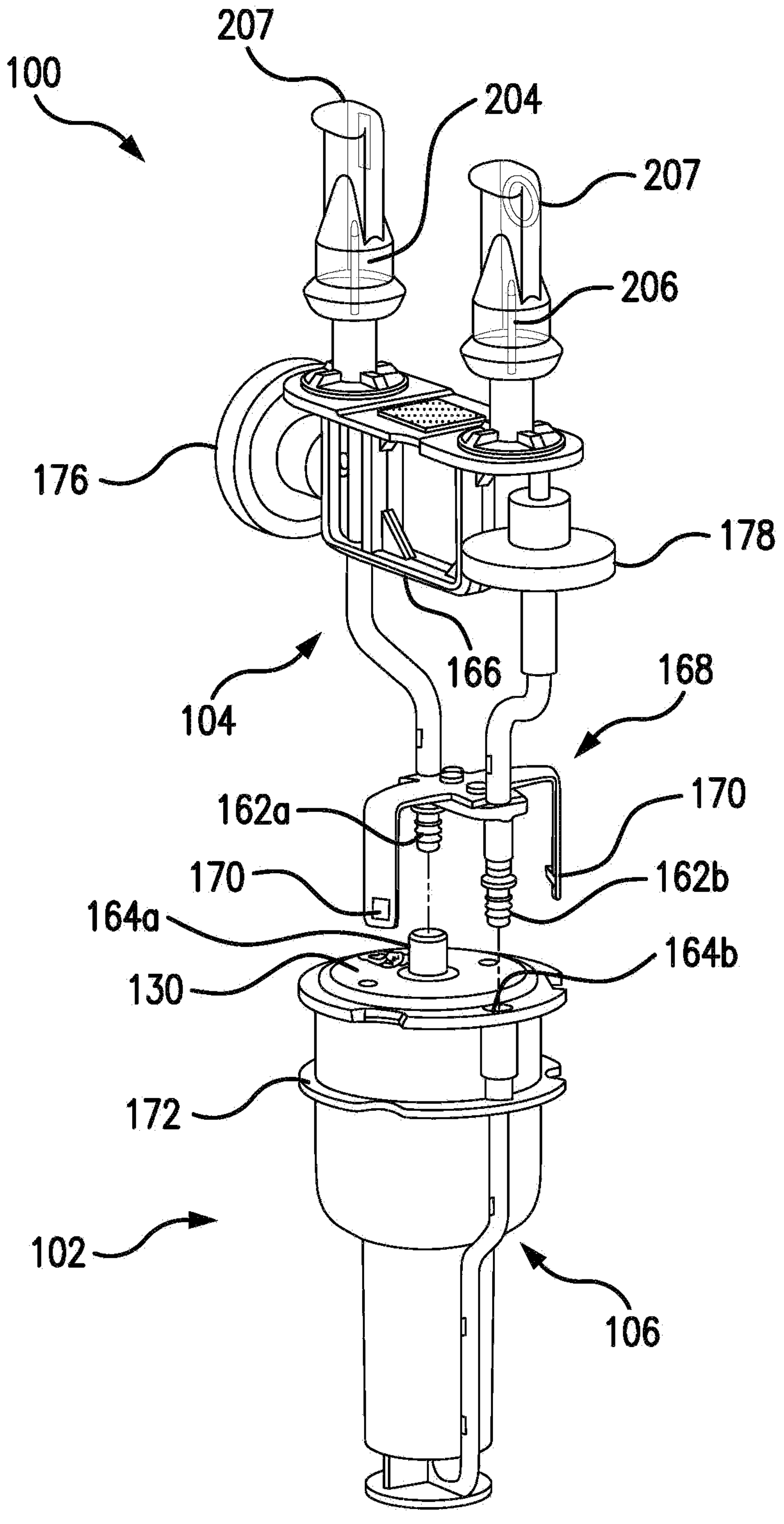
FIGS. 1A and 1B are perspective and cross-sectional views, respectively, of a Technetium 99-m generator column assembly in accordance with an embodiment of the present disclosure.

Repeat use of reference characters in the present specification and drawings is intended to represent same or analogous features or elements of the invention according to the disclosure.

DESCRIPTION OF THE PREFERRED EMBODIMENTS

Reference will now be made in detail to presently preferred embodiments of the invention, one or more examples of which are illustrated in the accompanying drawings. Each example is provided by way of explanation, not limitation, of the invention. In fact, it will be apparent to those skilled in the art that modifications and variations can be made in the present invention without departing from the scope and spirit thereof. For instance, features illustrated or described as part of one embodiment may be used on another embodiment to yield a still further embodiment. Thus, it is intended that the present invention covers such modifications and variations as come within the scope of the appended claims and their equivalents.

As used herein, terms referring to a direction or a position relative to the orientation of the Technetium-99m (Tc-99m) generator column assembly, such as but not limited to "vertical," "horizontal," "top," "bottom," "above," or "below," refer to directions and relative positions with respect to the generator column assembly's orientation shown in FIGS. 1A and 1B. Thus, for instance, the terms "vertical" and "top" refer to the vertical orientation and relative upper position in the perspective of FIGS. 1A and 1B, and should be understood in that context, even with respect to a generator column assembly that may be disposed in a different orientation.

Further, the term "or" as used in this application and the appended claims is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "and" as used in this application and the appended claims should generally be construed to mean "one or more" unless specified otherwise or clear from the context to be directed to a singular form. Throughout the specification and claims, the following terms takes at least the meanings explicitly associated herein, unless the context dictates otherwise. The meanings identified below do not necessarily limit the terms, but merely provide illustrative examples for the terms. The meaning of "a," "and," and "the" may include plural references, and the meaning of "in" may include "in" and "on." The phrase "in one embodiment," as used herein, does not necessarily refer to the same embodiment, although it may.

The present invention relates to a system and a method of using an alumina as a prevention or guard filter in a Molybdenum/Technetium-99m (Mo-99/Tc-99m) generator column assembly, preferably in a Mo-99/Tc-99m generator column assembly having a metal-molybdate containing powder. The present invention uses the alumina as a guard filter to control the amount of impurities (including soluble Mo-99 species) entrained with the eluate. As previously noted, Mo breakthrough is an inherent challenge to the utilization of Mo-99/Tc-99m generator column assemblies, but more particularly for molybdenum (non-uranium) production of Mo-99. The method and assemblies of the present invention addresses Mo breakthrough or elution efficiencies.

Figure 1B:
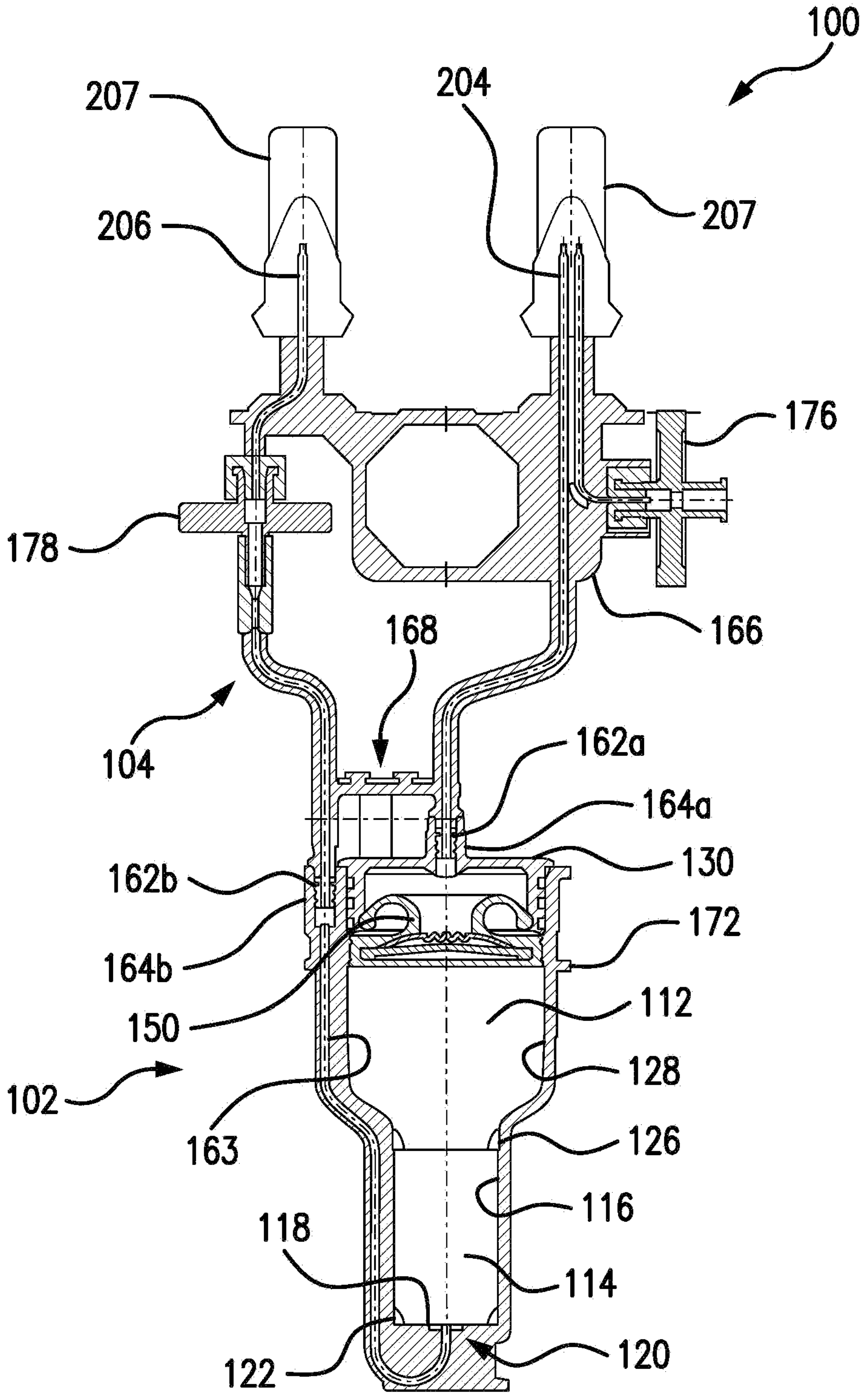
Figure 2:
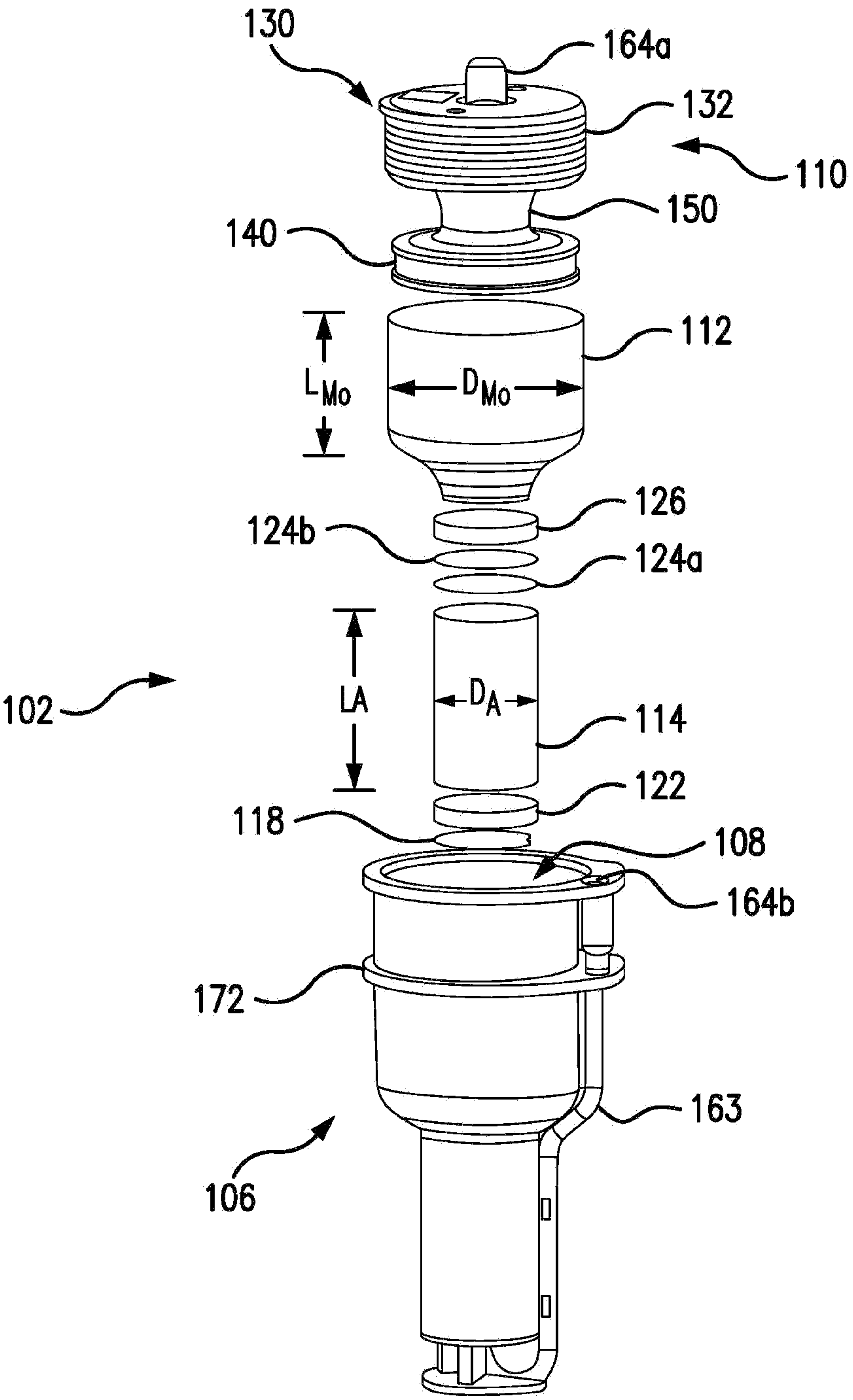
FIG. 2 is an exploded perspective view of the generator column shown in FIGS. 1A and 1B.

Referring now to the figures, a Mo-99/Tc-99m generator column assembly 100 in accordance with an embodiment of the present disclosure is shown in FIGS. 1A, 1B, and 2. The generator column assembly 100 includes a generator column 102 and generator flow path assembly 104 that is removably-secured thereto. As best seen in FIG. 2, the generator column 102 includes a column container 106 defining an interior volume 108, and a closure cap assembly 110 that is removably-secured to the column container 106, thereby enclosing the interior volume 108. Preferably, the column container 106 is constructed of medical grade polyetherimide thermoplastic (which is branded as ULTEM) that is semi-transparent high strength plastic capable of high service temperatures and radiation resistance, or the column container 106 is constructed of cyclic olefin copolymer (COC). The interior volume 108 of the column container 106 is configured to receive two separate beds of material, one a metal-molybdate containing powder bed 112 and the other an alumina powder bed 114, that are divided by filter media that is securely positioned to mitigate intermingling of the powders during shipping, handling, and the elution process. A lower portion 116 of the interior volume 108 of the column container 106 is configured to receive the chemical sorption bed 114 of alumina power to filter molybdenum from the Tc-99m eluate. The alumina powder bed 114 rests on a column membrane 118 that is disposed at the base of the interior volume 108 adjacent the column outlet 120. In the present example, the column membrane 118 is a 1.5 micro-meter (μm) pore sized filter made of glass fiber and is captured adjacent the column bottom by a tapered membrane ring 122 that is press-fit against the inside wall of the lower portion 114 of the interior volume 108. The packed alumina powder bed 114 is retained on its top end by a combination of membranes 124*a*/124*b* and a tapered retainer ring 126 that is also received in a press-fit against the inner wall of the lower portion 114 of the interior volume 108. Various combinations of filter media may be utilized such as, but not limited to, a porous polyethylene disc, a sandwich of several membranes of varying pore sized materials (polyethersulfone, polyester, polycarbonate, glass fiber), etc. As discussed in greater detail below, the alumina powder bed 114, or guard filter, has a bed height, or length ($L_A$) and a diameter ($D_A$), as dictated by the inner diameter of the lower portion 116 of the column container 106, that results in a length-to-diameter ratio ($L_A/D_A$) that is preferably equal to or approximately 1.8 or greater, as discussed in greater detail below.

Figures 3A, 3B, 3C, 3D:
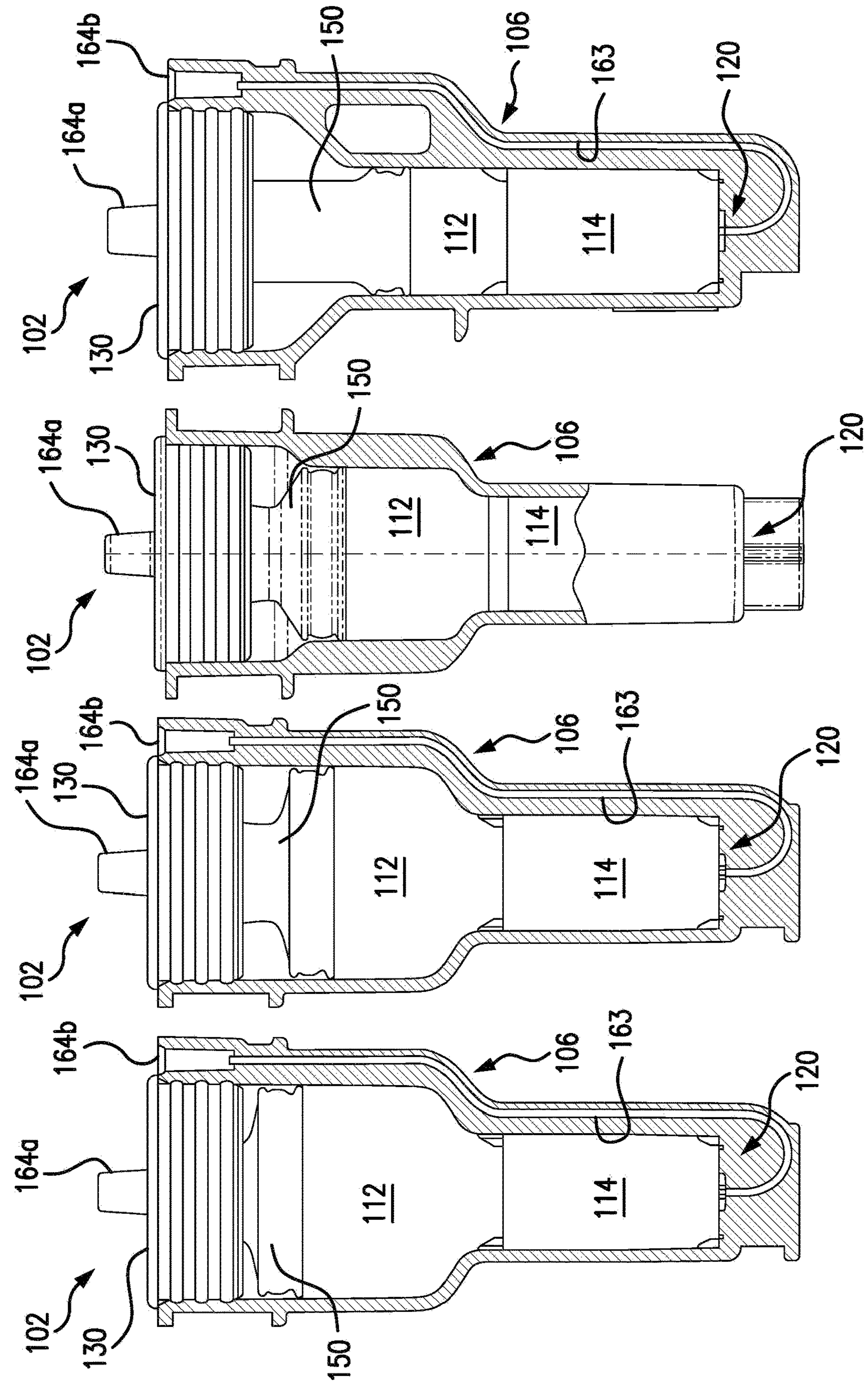
FIGS. 3A, 3B, 3C, and 3D are cross-sectional views of varying sized generator columns in accordance with alternate embodiments of the present disclosure.

Referring specifically to FIGS. 1B and 2, the interior volume 108 of the column container 106 also includes an upper portion 128 that is configured to receive the molybdate powder bed 112 that is retained therein by the closure cap assembly 110. As shown, the diameter ($D_{Mo}$) of the molybdate powder bed 112 is greater than the diameter ($D_A$) of the alumina powder bed 114 due to the fact the inner diameter of the upper portion 128 of the interior volume 108 is greater than the inner diameter of the lower portion 116 of the interior volume 108. As well, the height molybdate powder bed, or length ($L_{Mo}$), is variable dependent upon the powder loading and the size of the closure cap assembly 110 that is utilized to seal the interior volume of the column container 106 (FIGS. 3A and 3B), as discussed in greater detail below. In contrast, the ($L_A/D_A$) ratio of the alumina powder bed 114 is preferably kept constant for the generator column assembly 100 although the ($L_{Mo}/D_{Mo}$) ratio of the molybdate powder bed 112 may vary, as would be done in order to create generator column assemblies of varying Curie content (i.e., 2, 8, 16 Curies ($C_i$).

Figure 4B:
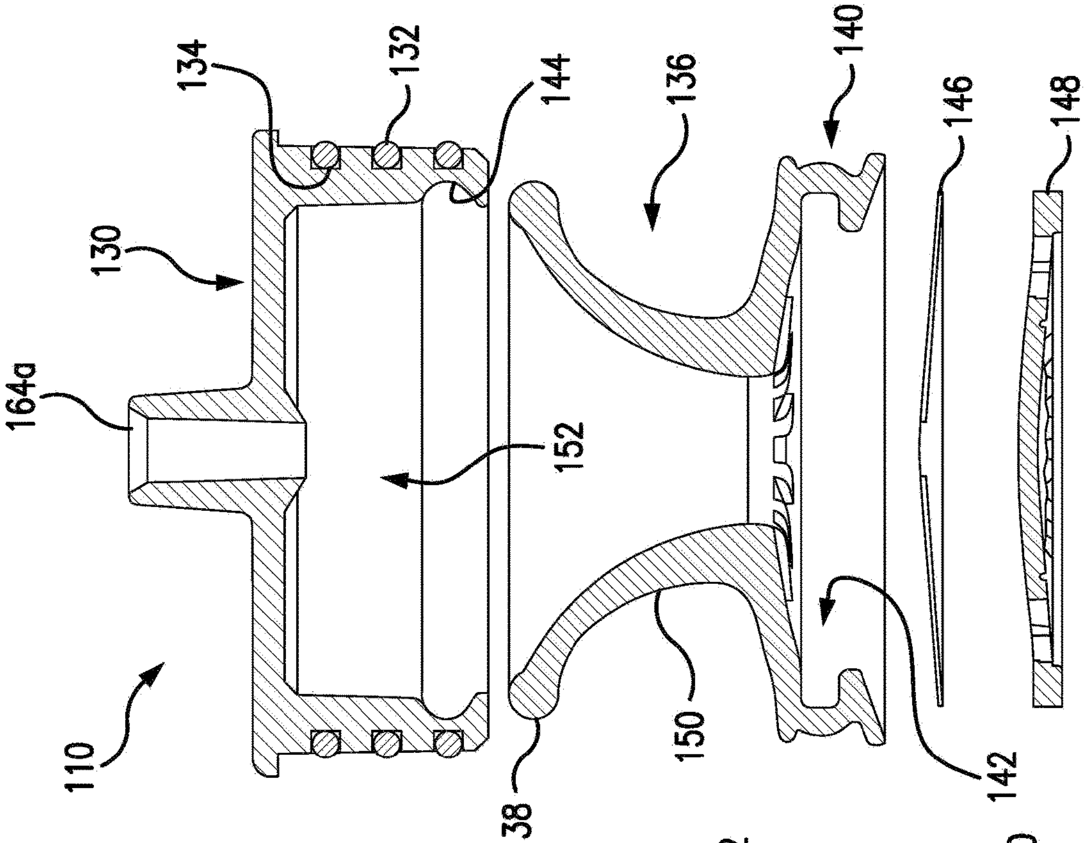
FIGS. 4A and 4B are a cross-sectional and an exploded cross-sectional view, respectively, of the generator column cap assembly of the generator column assembly shown in FIGS. 1A and 1B.
Figure 4A:
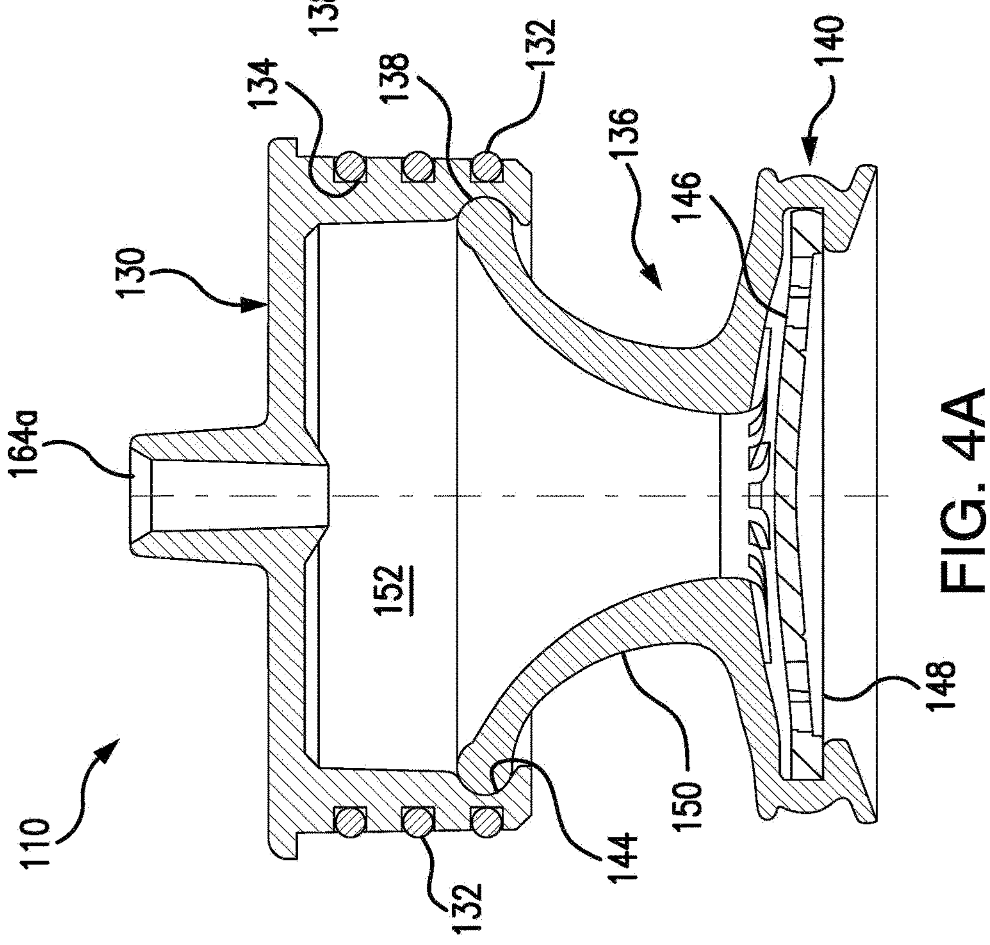

An embodiment of a generator column closure cap assembly 110 is best seen in FIGS. 4A and 4B. The closure cap assembly 110 includes a plastic-molded closure cap 130 including one or more O-ring seals 132 received in corresponding annular grooves 134 on the outer cylindrical surface of the closure cap 130. The closure cap assembly 110 also includes a silicone elastomeric boot 136 including a circular coupling ring 138 disposed at its top end, and a disc-shaped base portion 140 at its bottom end that defines a cylindrical recess 142. The coupling ring 138 is configured to be received in an annular groove 144 defined by the inner wall of the closure cap 130 whereas the cylindrical recess 142 is configured to receive a membrane filter 146 and a perforated plastic-molded dispersion disc 148 therein. A vortex-shaped body portion 150 extends between the coupling ring 138 and the base portion 140 of the closure cap assembly 110 and allows the base portion 140 to be urged upwardly toward the closure cap 130 as necessary to accommodate variously sized molybdate powder beds 112 within the generator column assembly 100, as best seen in FIG. 1B. As shown, the closure cap 130 defines a cylindrical recess 152 that is configured to receive the vortex-shaped body portion 150 therein as the base portion 140 of the elastomeric boot is urged toward the closure cap 130. The coupling ring 138 remains connected to the annular groove 144 during flexure of the elastomeric boot 150 as the overall height of the closure cap assembly 110 adjusts to accommodate varying molybdate powder bed volumes. Additionally, a female luer port 164*a* is formed in the top wall of the closure cap 130 as part of the eluate flow path, as discussed in greater detail below.

An advantageous parameter of the present disclosure is that each geometry of disclosed generator column assembly has molybdate powder bed capacity variance in which the same closure cap assembly 110 may be utilized to secure the variously sized molybdate powder beds therein. For example, referring now to FIGS. 3A and 3B, a generator column assembly 100 that is configured to contain up to 16 Ci of Mo-99 for Tc-99m generation may accommodate variously sized molybdate powder beds in order to optimize the length-to-diameter ratios ($L_{Mo}/D_{Mo}$) of those powder beds to achieve the desired Ci content. Given the variability of different powder loadings, dispensed versus pack-filled volumes, etc., the closure cap assembly 110 of the present disclosure offers compliancy to accommodate the range of molybdate powder volumes required for optimization. As well, the closure cap assemblies 110 maintain the stability of the powder beds during handling, shipment, and the elution process. As noted, FIGS. 3A and 3B both show identical generator columns 102 that are capable of containing up to 16 Ci of Mo-99. Note, however, due to possible variations in powder sizes, dispensed versus pack-filled, time from irradiation to loading, etc., differing volumes of molybdate powder may be required to achieve the same Ci content in each example. The compliancy of the generator column closure cap assembly 110 allows the same generator column container 106 geometry to accommodate a smaller volume of molybdate powder in the example shown in FIG. 3B as opposed to the example shown in FIG. 3A. Additionally, the compliancy of the closure cap assembly 110 allows the generator column 102 shown to be utilized for varying powder loading up to 16 Ci, as well as lesser amounts such as 14 Ci, 12 Ci, 10 Ci, etc. Preferably, although geometries of the column containers may vary, such as an 8 $C_i$ column container shown in FIG. 3C and a 2 Ci column container shown in FIG. 3D, the same diameter closure cap 130 may be used with each closure cap assembly 110 across the range of variously-sized column containers 106. Note, however, the elastomeric boot portions 150 will have varying dimensions dependent upon the inner diameters of the lower portions of the interior volumes 108 of the column containers 106. This feature preferably reduces the number of different parts required to produce varying Ci loads. Note, however, the length-to-diameter ratio ($L_A/D_A$) of the alumina powder bed in the variously sized generator column assemblies preferably remains constant.

Figure 5A:
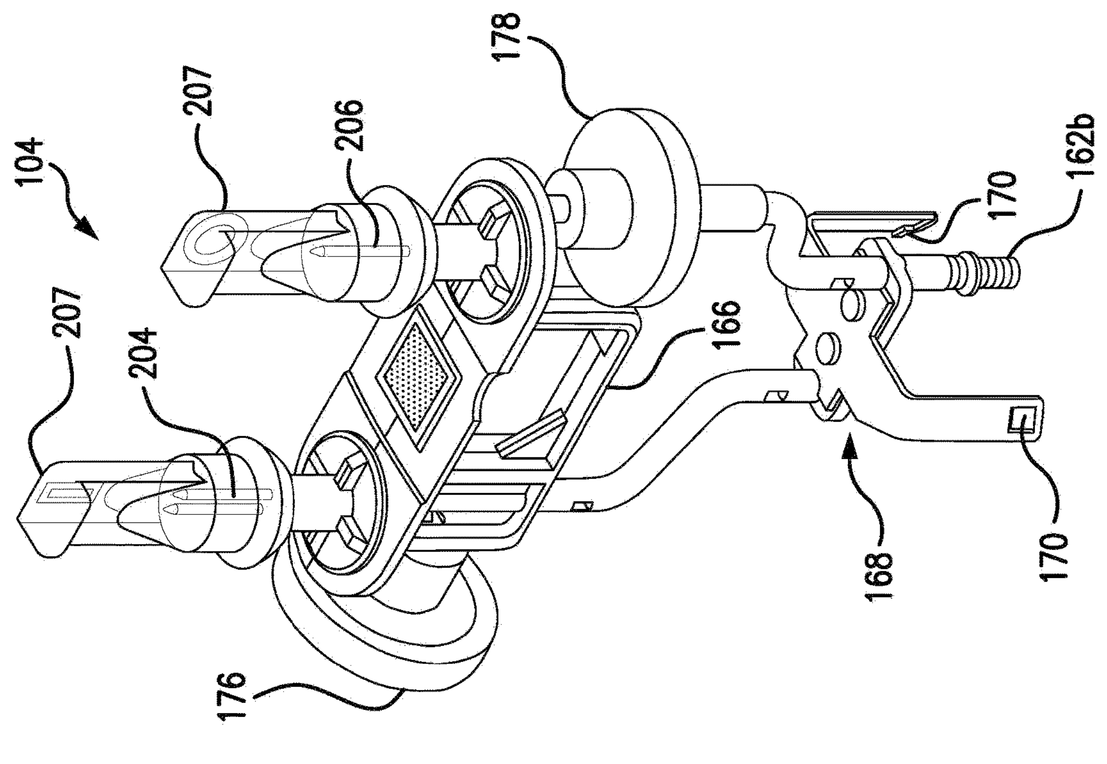
FIGS. 5A and 5B are perspective and cross-sectional views, respectively, of the upper flow path assembly of the generator column assembly shown in FIGS. 1A and 1B.
Figure 5B:
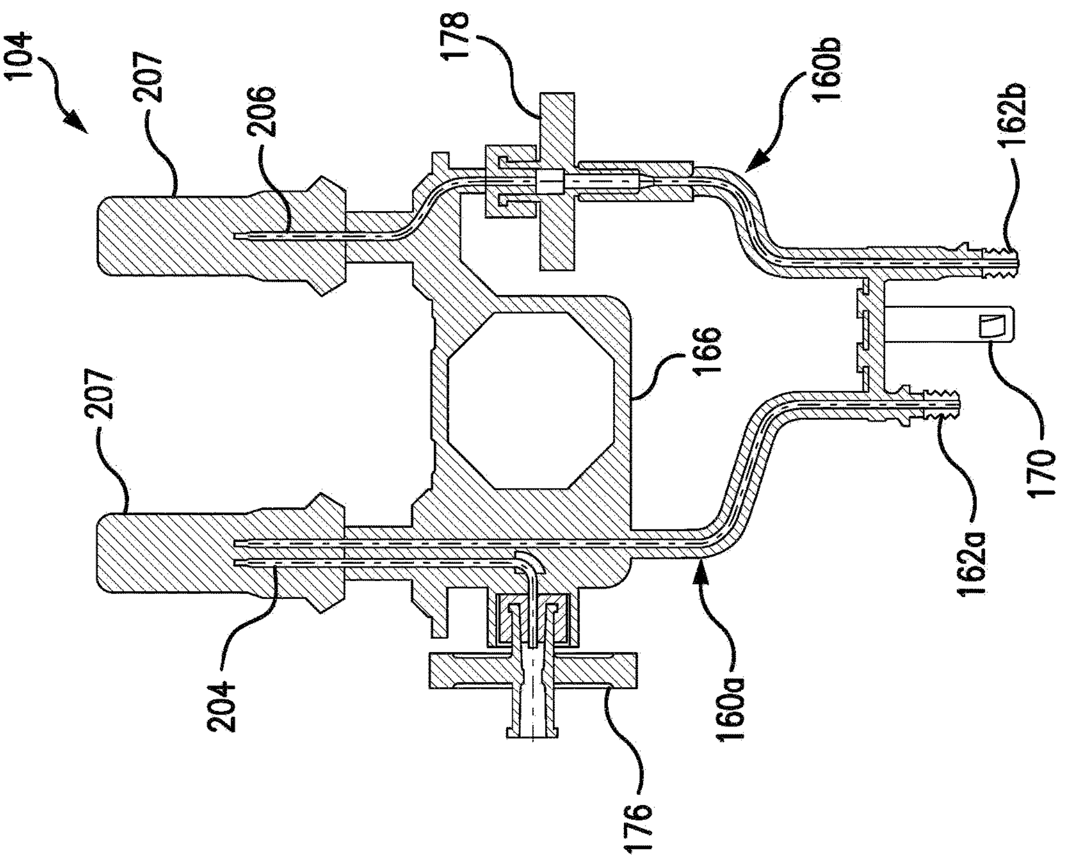

Referring again to FIGS. 1A and 1B, the flow path of the generator column assembly 100 includes an upper flow path 160*a*/160*b* that is defined within the generator flow path assembly 104 and a lower flow path 162 that is unitarily formed with the wall of the column container 106. Referring additionally to FIGS. 5A and 5B, the upper flow path 160*a*/160*b* of the generator flow path assembly 104 includes the flow inlet 160*a* and the flow outlet 160*b*, both the flow inlet 160*a* and the flow outlet 160*b* including stainless steel hypodermic needle conduits. The flow inlet 160*a* includes an inlet male luer 162*a* and an inlet needle 204, and the flow outlet 160*b* includes an outlet male luer 162*b* and an outlet needle 206. Silicone needle covers 207 are utilized to hermetically seal the generator flow path assembly 104 after sterilization, the needle covers 207 being removed prior to use by the end user. The inlet and outlet male luers162*a* and 162*b* are preferably tapered and include multiple ribbed or barbed-like rings to help insure leak-tight connections with corresponding female inlet and outlet ports 164*a* and 164*b*, respectively, that are disposed on the top wall of the closure cap assembly 110 and column container 106, respectively.

As best seen in FIG. 5B, the upper flow path 160*a*/160*b* of the generator flow path assembly 104 includes a body portion 166 molded of a clear polycarbonate resin that is highly flexible and radiation resistant. The body portion 166 harnesses and precisely positions each of the flow inlet 160*a* and the flow outlet needle 160*b* to assist in releasably securing the generator flow path assembly 104 to the generator columns 102, as shown in FIG. 1B. As well, the generator flow path assembly 104 includes a metal U-shaped clip 168 that is secured to the body 166 of the generator flow path assembly 104. Each leg of the U-shaped clip 168 includes a catch 170 that is configured to releasably engage an annular lip 172 that extends radially-outwardly from an outer surface of the column container 106. When assembling the generator column assembly 100, once the generator flow path assembly 104 has been secured to the column container 106, the generator column assembly 100 is ready to be terminally sterilized prior to being received in a radiation shield assembly 174.

As shown, the generator flow path also includes an air inlet vent filter 176 that preferably contains a 0.2 μm PE filter membrane and associated vent needle 207. The vent filter 176 and vent needle 207 allow for the venting of a saline vial (not shown) that is pierced by both the inlet needle 204 and the vent needle 207 so that saline is drawn into the flow inlet 160*a* by an eluate vial (not shown) that is under-vacuum and includes a cap that is similarly pierced by the outlet needle 206 of the flow outlet 160*b*. As well, an outlet capsule filter 178 is disposed in line with the flow outlet 160*b* and preferably includes a hydrophilic 0.2 μm membrane with hydrophobic striations to prevent air lock during the elution process. Preferably, the luer seals and filter boot seals that are used in the generator flow path are standard fittings used with off the shelf capsule filters.

Figure 6A:
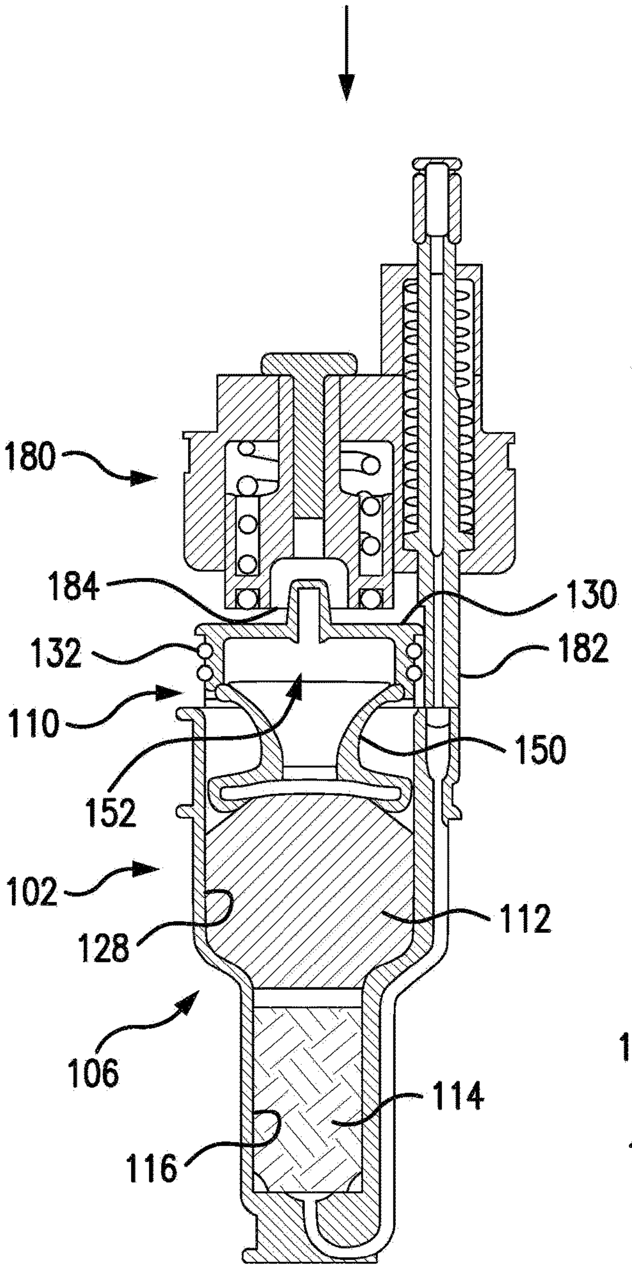
FIGS. 6A, 6B, and 6C are cross-sectional views of the generator column shown in FIG. 2 during the capping process.
Figure 6B:
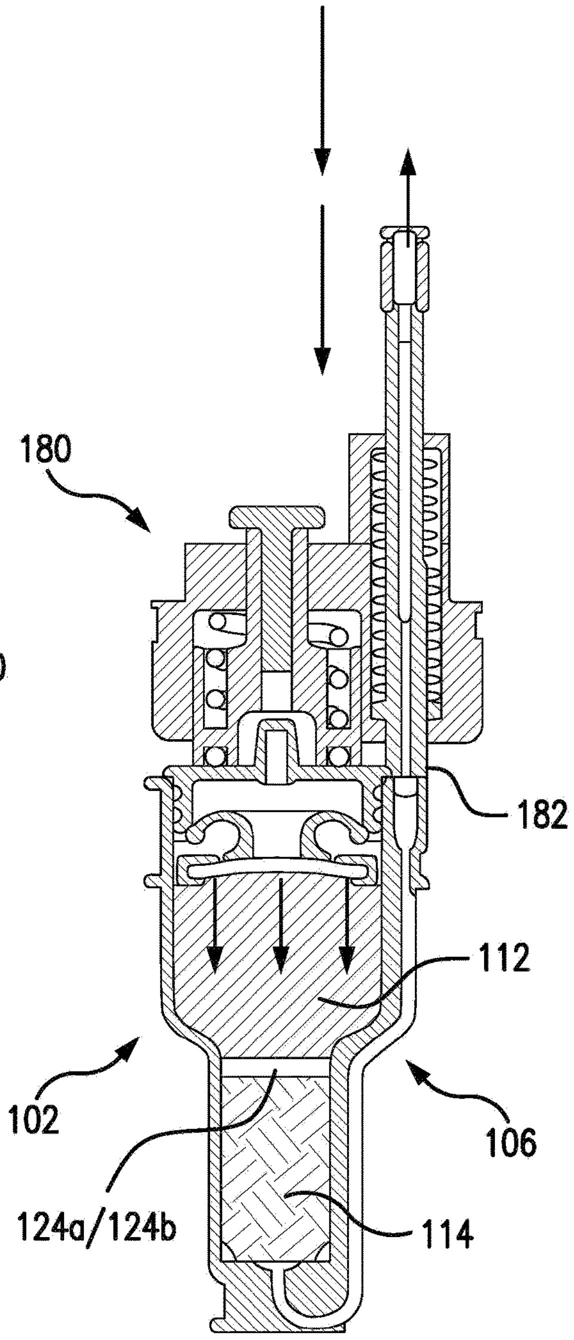
Figure 6C:
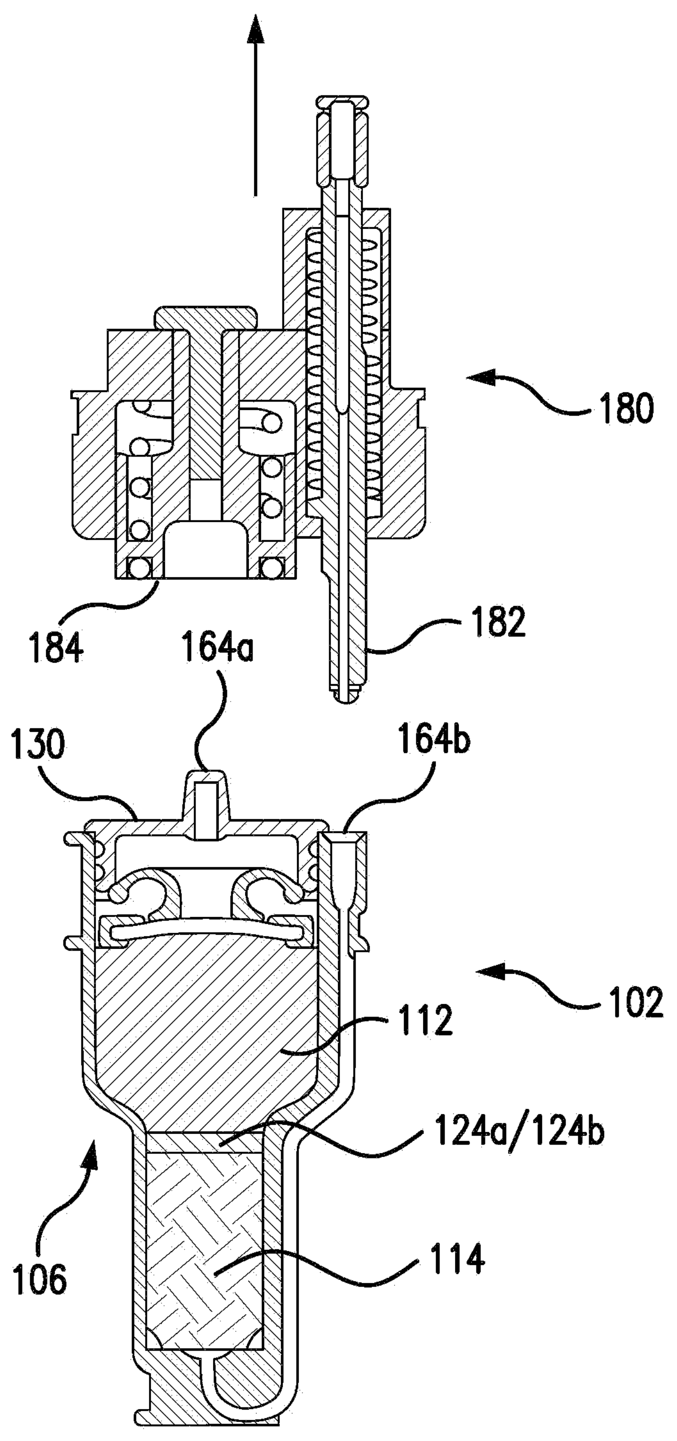

Referring now to FIGS. 6A through 6C, the assembly of the generator column assembly 100 is described. As previously noted, an alumina powder bed 114 is first established in the lower portion 116 of the interior volume 108 of the column container 106. Next, molybdate powder 112 is dispensed into the upper portion 128 of the interior volume 108 of the column container 106, with the alumina powder and molybdate powder being separated by membrane filters 124*a*/124*b* to prevent intermingling. After the addition of the required amount of molybdate powder to achieve the desired Ci loading is complete, the base portion 140 of the elastomeric boot 150 of the closure cap assembly 110 is inserted into the column container 106 so that it engages the loose accumulation of molybdate powder and its circular outer perimeter forms a seal with the inner surface of the upper portion 128 of the interior volume 108. Next, a process tool 180 with two independent connection fittings is lowered onto the generator column 102, as shown in FIG. 6A. The generator column outlet flow port 164*b* is engaged with a protruding vacuum line fitting 182 and a leak-tight seal is created with the outlet flow port 164*b*. A vacuum is then applied via the vacuum line fitting 182 to pull air downward through the unpacked molybdate powder bed 112. As the process tool 180 continues to be lowered, the tool center hub 184 makes contact with the closure cap assembly 110 and the interior volume 108 of the generator column 102 becomes sealed by the elastomeric O-rings 132 of the closure cap 130. The vacuum applied force is increased causing the molybdate powder bed 112 to uniformly compact as a result of the air expelled from the molybdate powder bed 112. Furthermore, the lowering of the closure cap 130 fully engages the elastomeric boot 150 onto the molybdate powder bed 112. The assembly process prevents the release of airborne radioactive powder by pulling downward on the displaced air caused by insertion of the closure cap 130, the closure cap 130 acting as a piston. Additionally, the stream of air uniformly packs the molybdate powder while simultaneously inserting the closure cap 130 until it is firmly seated. As best seen in FIG. 6C, when the closure cap assembly 110 is firmly seated in the column container 106, the elastomeric boot 150 may be urged upwardly into the cylindrical recess 152 defined by the closure cap 130, as is necessary to ensure that various molybdate powder loadings may be accommodated by a single size column container 106. Note, in alternate processes, application of a vacuum force will not be applied to pack the bed.

A unique attribute of the radionuclide powder-filled generator column assembly 100 is the intermediary connection ports that allow column conditioning after assembly of the generator column container 106 and the closure cap assembly 110. The upper flow path assembly 104 is connected to the column container 106 only after the irradiated molybdate powder is disposed therein. As such, the upper flow path assembly includes medical grade filters and access needles 204, 206, and 207 that are not exposed to potentially radioactive matter during the assembly and preparation process for shipment. As well, the fact that the upper flow path assembly 104 is not installed until after column conditioning further assures the end user is provided with a clean and dry upper flow path, thereby helping to maintain sterile conditions and reduce the chance of exposure of the end user to radiation.

Figure 7B:
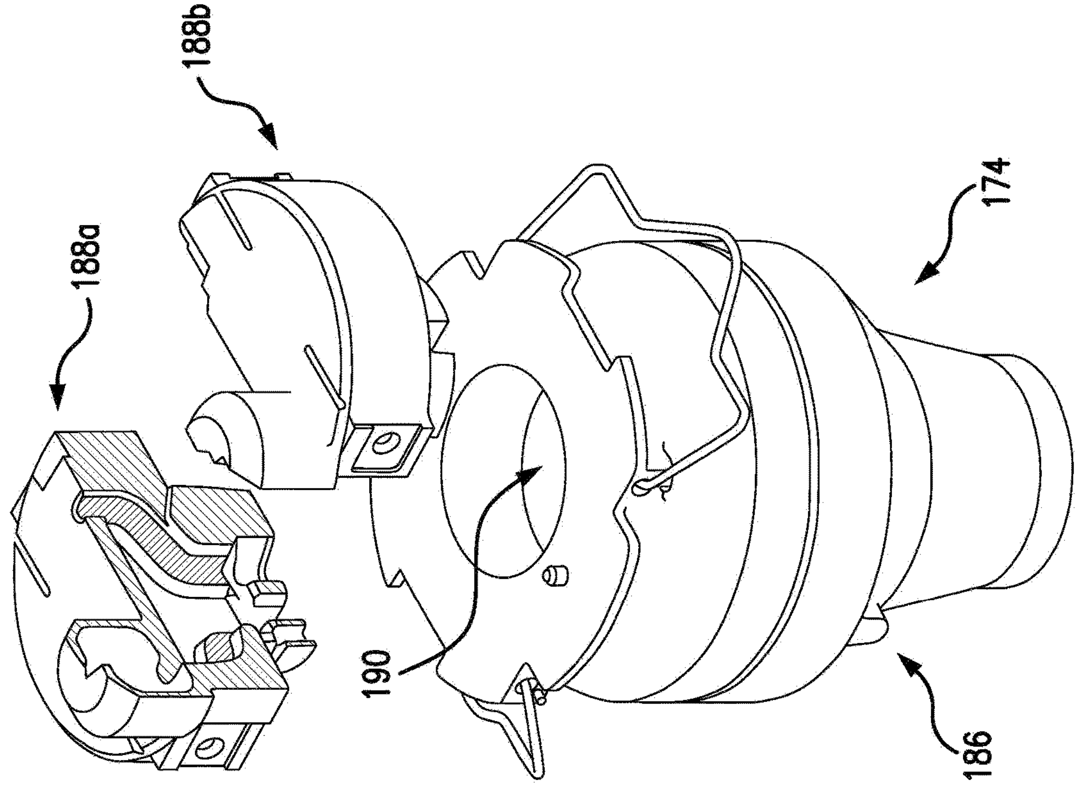
FIGS. 7A, 7B, and 7C are a perspective, a perspective-exploded, and a cross-sectional view, respectively, of a shield assembly for use with the generator column assembly shown in FIGS. 1A and 1B.
Figure 7A:
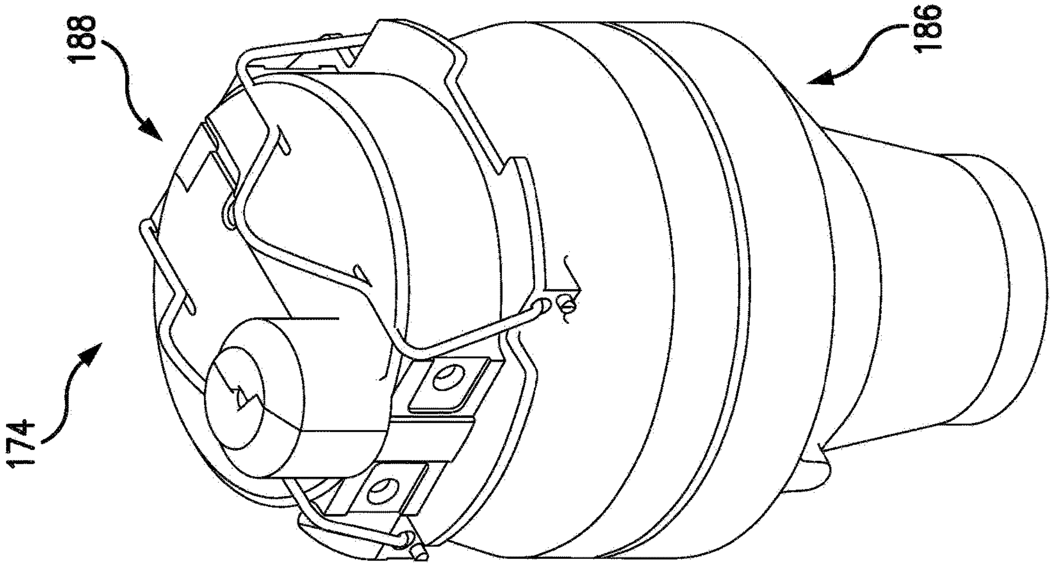
Figure 7C:
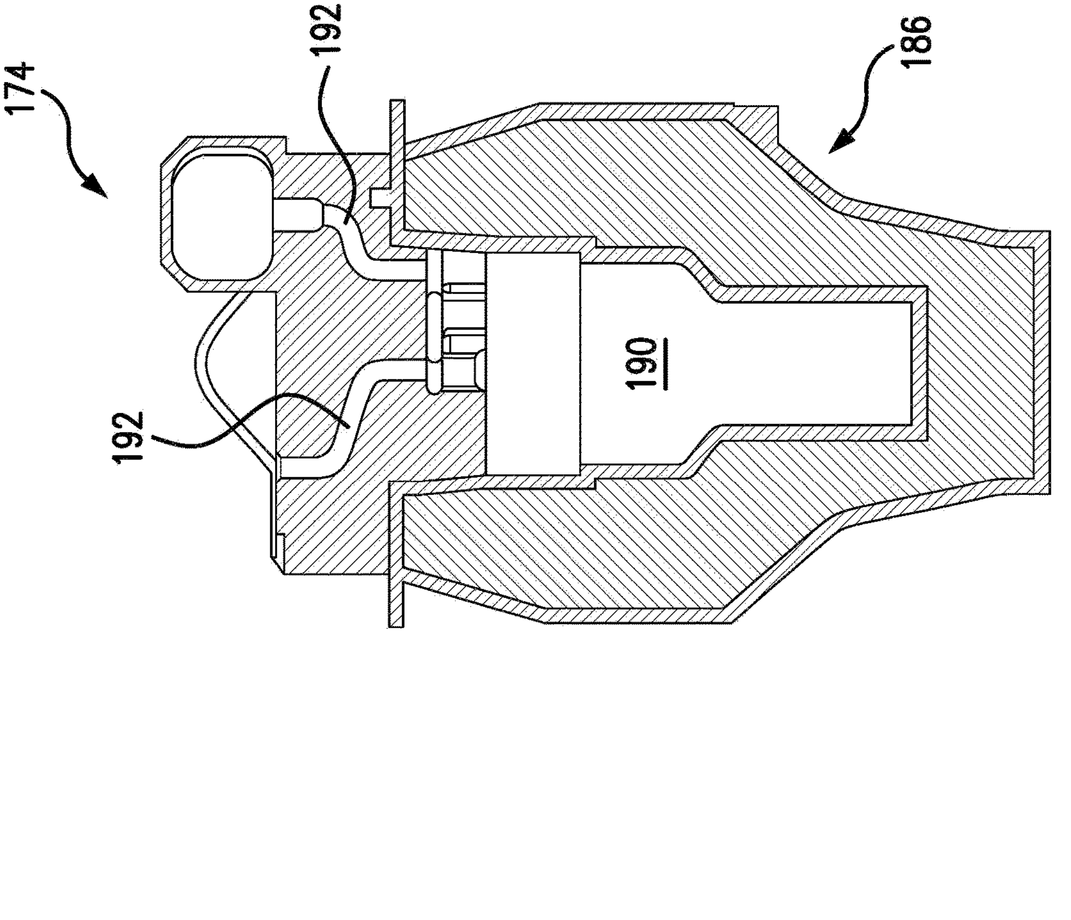

Referring now to FIG. 7A through 7C, prior to shipment to the end user, the generator column assembly 100 is enclosed in the radiation shield assembly 174 that includes a body portion 186 that is formed of depleted uranium and enclosed by cladding, and a cap 188 formed by a pair of cap halves 188*a* and 188*b*. The body portion 186 of the shield assembly 174 defines an interior compartment 190 that is shaped to conform to the outer wall of the generator column assembly 100. Preferably, referring additionally to FIGS. 3A through 3D, the variously sized generator column assemblies 100 may each be received in the same shield assembly 174 due to the fact that the maximum diameter of the bottom portion 116 (FIG. 1B) of each generator column container 106 is the same, as is the maximum diameter of the upper portion 128 of each generator column container 106. As well, in that the same generator flow path assembly 104 may be used with all of the variously sized generator column containers 106 due to the fact that the same closure cap 130 may be used with each generator column assembly, the same shield cap 188 may be utilized for the variously sized generator column assemblies 100. As shown in FIGS. 7B and 7C, one or both of the shield cap halves 188*a* and 188*b* includes interior pathways 190 that are configured to receive the generator flow path assembly 104 therein. Note that neither interior pathway 190 formed in the shield cap 188 forms a line of sight with the interior chamber 190 of the body portion 186, thereby preventing a direct pathway for the emission of radiation.

Figure 8A:
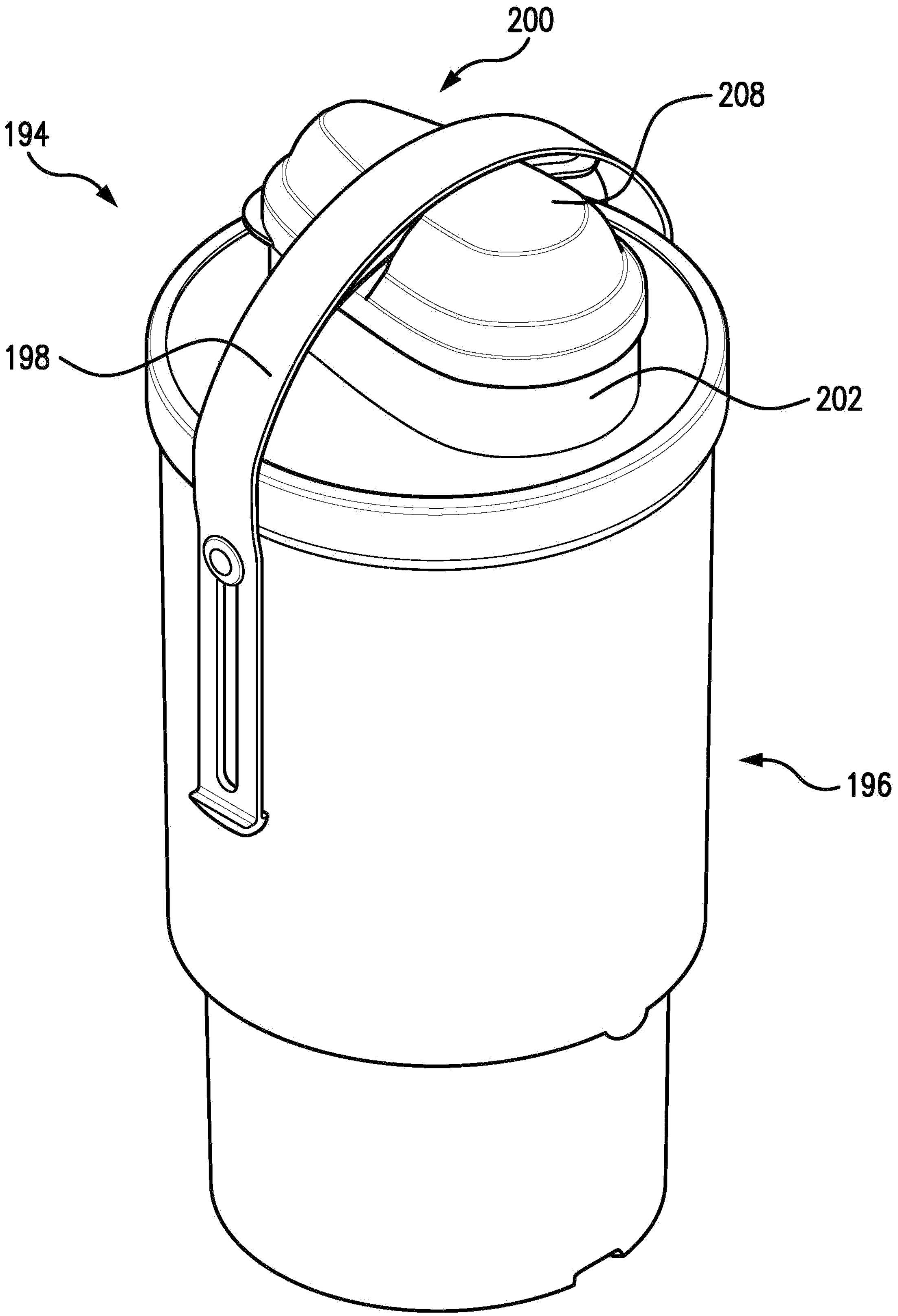
FIGS. 8A and 8B are perspective and cross-sectional views, respectively, of a canister assembly for use with the generator column assembly shown in FIGS. 1A and 1B.
Figure 8B:
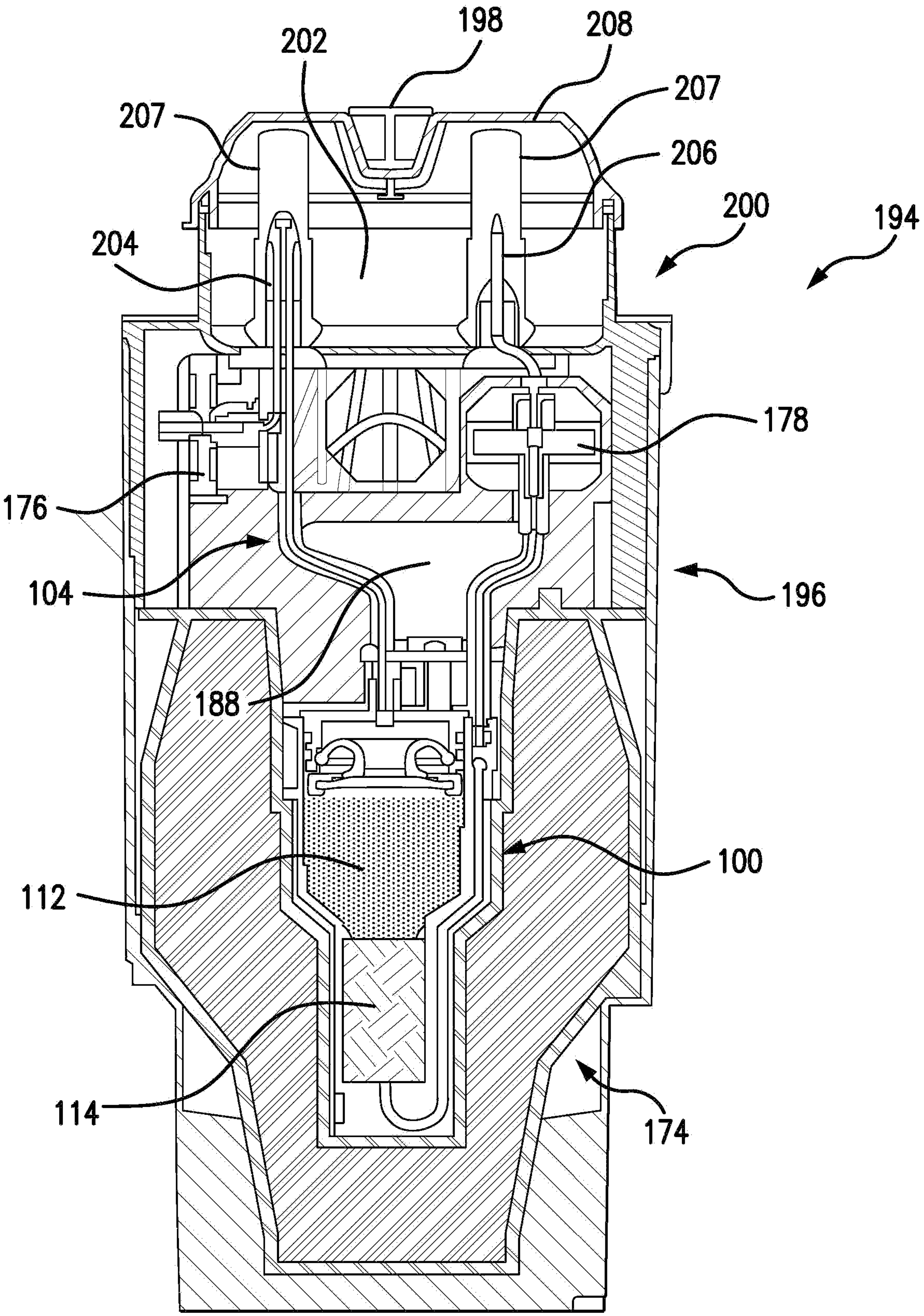

Referring additionally to FIGS. 8A and 8B, after the generator column assembly 100 is placed within the radiation shield assembly 174, the shield assembly 174 is placed into a handling canister assembly 194 including a cylindrical plastic body 196 that includes a handle 198, and a cover 200 portion defining a reservoir 202 is then used to seal the cylindrical canister assembly. As shown in FIG. 8B, once received within the shield assembly 174 and the handling canister assembly 194, only the inlet flow needle 204 and outlet flow needle 206 are accessible by an end user within the reservoir 202. A lid 208 is provided that is removably secured to the reservoir 202 of the handling canister assembly 194 to protect the end user and needle fittings.

Figure 9:
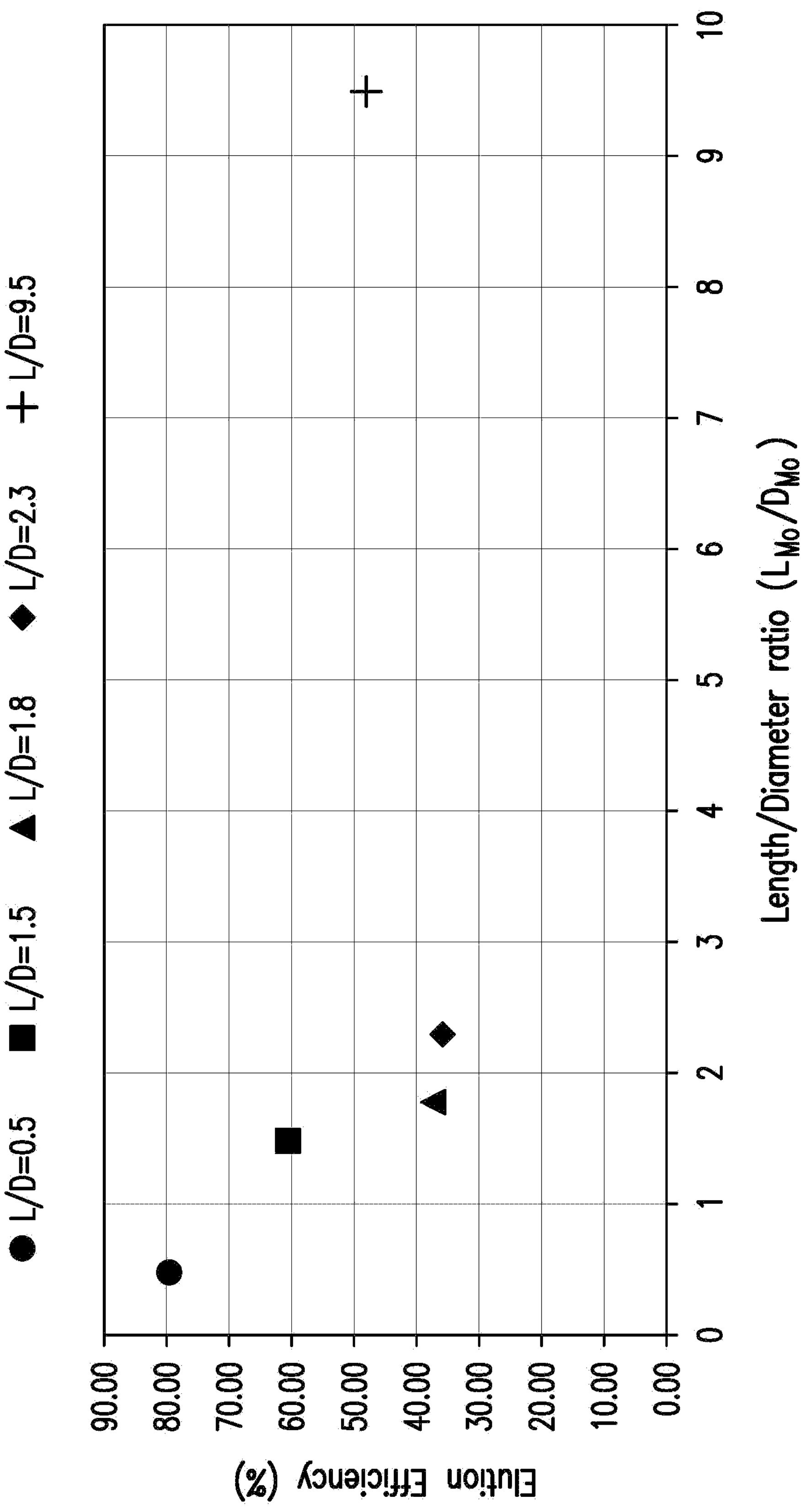
FIG. 9 is a graphical representation of elution efficiencies of generator column assemblies having varying length-to-diameter geometries for the corresponding molybdate powder bed.

Referring now to FIG. 9, a graph of elution efficiencies for variously configured molybdate powder beds is shown. Acceptable elution efficiencies are considered to be above 70%, and optimizing length-to-diameter ratio ($L_{Mo}/D_{Mo}$) of the molybdate powder bed is the primary means for achieving the desired elution efficiencies while maintaining elution times less than approximately five minutes. Test results of the presently disclosed generator column assemblies reveal that $L_{Mo}/D_{Mo}$ ratios in the range of approximately 0.5 to 0.9 are recommended for the molybdate powder bed. Specifically, $L_{Mo}/D_{Mo}$ ratios within the range of approximately 0.5 to 0.9 were found to prevent channeling within the molybdate powder bed, as well as reduce the overall amount and weight of shielding required due to the reduced overall height of the generator column assembly.

Figure 10:
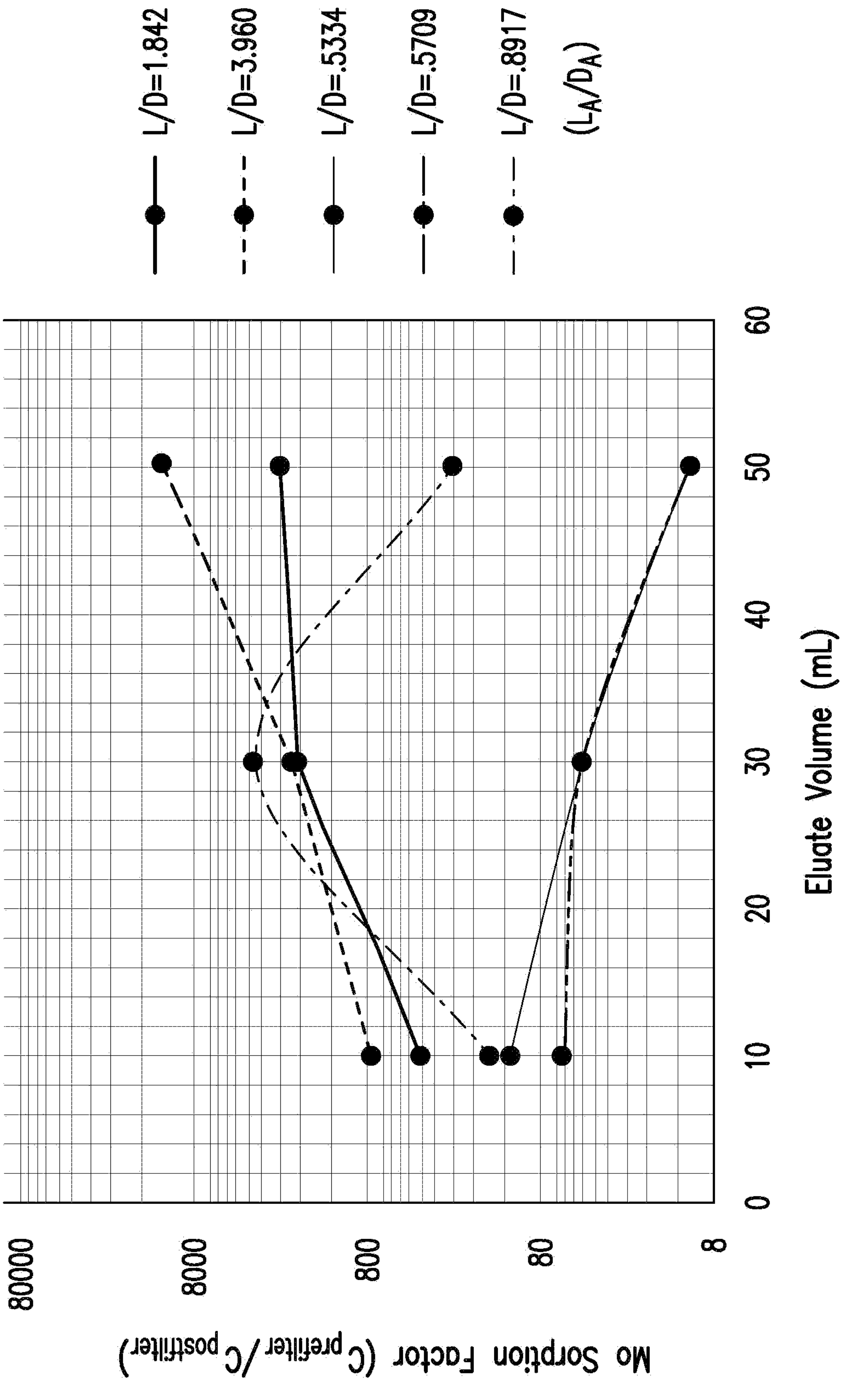
FIG. 10 is a graphical representation of the Mo sorption factors of alumina bed guard filters of varying length-to-diameter geometries for generator column assemblies.
Figure 11:
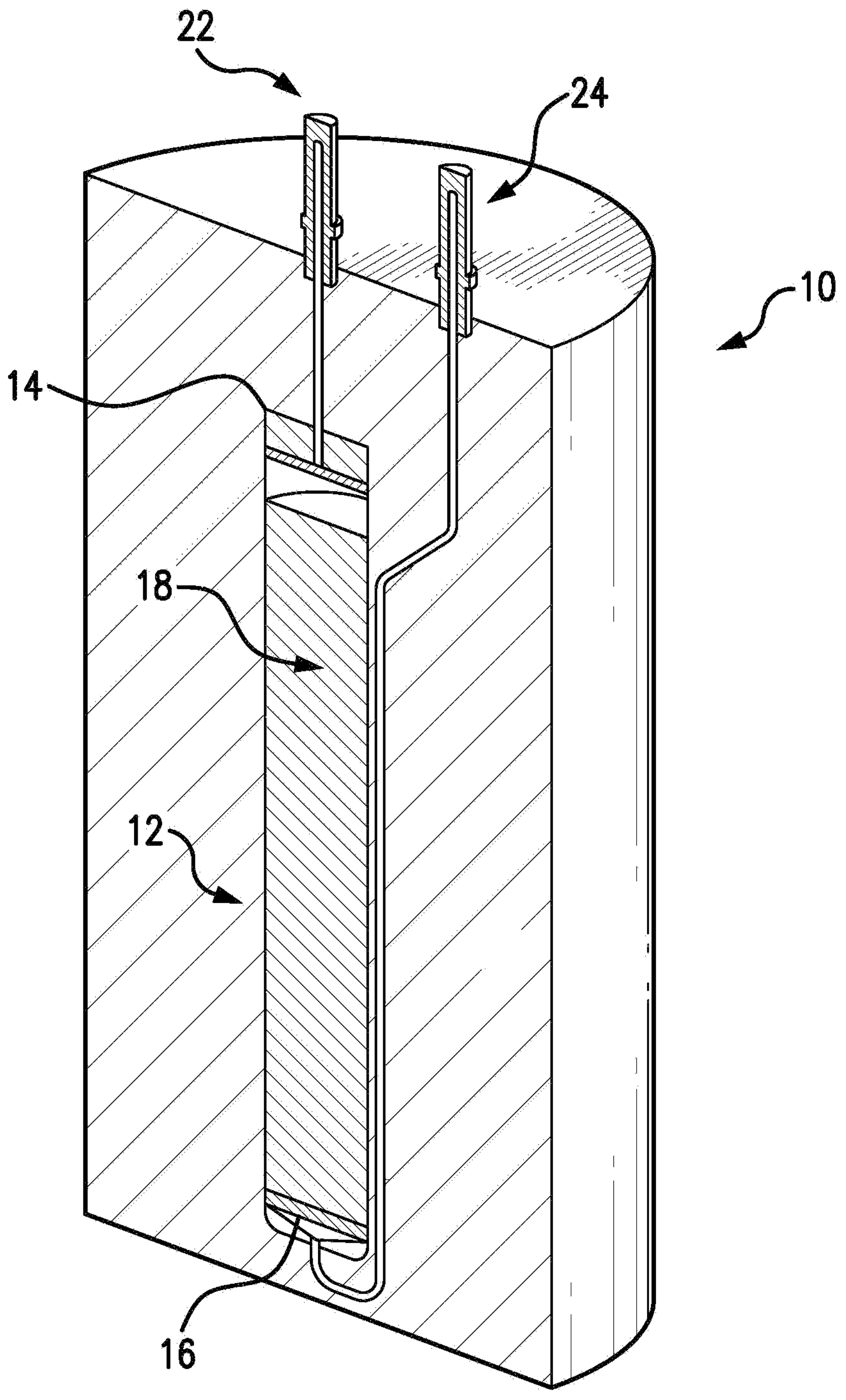
FIG. 11 (PRIOR ART)
FIG. 11 is a perspective cross-sectional view of a prior art generator column assembly.

Referring additionally to FIG. 10, length-to-diameter ratios ($L_A/D_A$) of approximately 1.8 or greater were found to work best for the alumina powder bed. Specifically, as shown in the graph, $L_A/D_A$ ratios of 1.8 and greater produced desirable sorption factors yet allowed the elution process to be effectively performed numerous times on a single generator column assembly without allowing molybdenum breakthrough. Length-to-diameter ratios of the alumina absorption bed less than 1.8 exhibited reduced sorption factor effectiveness over multiple uses.

It will therefore be readily understood by those persons skilled in the art that the present invention is susceptible of broad utility and application. Many embodiments and adaptations of the present invention other than those herein described, as well as many variations, modifications and equivalent arrangements, will be apparent from or reasonably suggested by the present invention and the foregoing description thereof, without departing from the substance or scope of the present invention. Accordingly, while the present invention has been described herein in detail in relation to the preferred embodiments, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements.

The invention claimed is:

1. A generator column assembly for the elution of a radioisotope, comprising:

a generator column container having a bottom wall defining flow outlet aperture, an open top end, and a sidewall extending from the open top end to the bottom wall that defines an interior volume having a substantially cylindrical upper volume portion and a substantially cylindrical lower volume portion, the upper volume portion having a diameter that is greater than a diameter of the lower volume portion; and a closure cap assembly including a substantially cylindrical container cap defining a flow inlet aperture, the container cap being configured to be slidably received in the open top end of the generator column container.

2. The generator column assembly of claim 1, further comprising an elutable media disposed within the upper volume portion of the generator column container and a filter media disposed within the lower volume portion of the generator column container.

3. The generator column assembly of claim 2, wherein the elutable media is a molybdate powder bed and the filter media is an alumina powder bed.

4. The generator column assembly of claim 2, wherein the upper volume portion of the generator column container has a length-to-diameter ratio of approximately 0.5 to 0.9, a length of the upper volume portion being equal to a vertical length of the elutable media.

5. The generator column assembly of claim 4, wherein the lower volume portion of the generator column container has a length-to-diameter ratio of approximately 1.8 or greater, a length of the lower volume portion being equal to a vertical length of the filter media.

6. The generator column assembly of claim 2, wherein the container cap includes a top wall and a substantially cylindrical sidewall extending downwardly therefrom, thereby defining a substantially cylindrical recess having an open bottom end.

7. The generator column assembly of claim 6, further comprising an annular groove defined in an outer surface of the cylindrical sidewall and an O-ring, wherein the O-ring is disposed within the annular groove.

8. The generator column assembly of claim 6, the closure cap assembly further comprising:

an annular coupling groove defined by an inner surface of the sidewall of the container cap; and an elastomeric boot including an annular coupling ring and a body portion extending downwardly therefrom, wherein the annular coupling ring is disposed within the annular coupling groove.

9. The generator column assembly of claim 8, wherein the elastomeric boot further comprises a substantially cylindrical base portion disposed at a bottom end of the body portion, the base portion having a diameter that is substantially equal to the diameter of the upper volume portion of the generator column container.

10. The generator column assembly of claim 9, wherein the base portion is movable between a first position in which the base portion is disposed a first distance from the container cap and a second position in which the base portion is disposed a second distance from the container cap, the first distance being greater than the second distance.

11. The generator column assembly of claim 9, wherein the body portion of the elastomeric boot is formed by a sidewall that defines a hollow vortex.

12. The generator column assembly of claim 2, wherein the generator column container further comprises an outlet aperture defined in the bottom wall and an outlet flow path in fluid communication with the outlet aperture and the flow outlet aperture.

13. The generator column assembly of claim 12, wherein the flow outlet aperture is adjacent the open top end of the generator column container and the outlet flow path is defined by the sidewall.

14. The generator column assembly of claim 1, further comprising a generator flow path assembly including a saline flow path and an eluate flow path, wherein the saline flow path and the eluate flow path are selectively connectable to the flow inlet aperture and the flow outlet aperture, respectively.

15. A generator column assembly for the elution of a radioisotope, comprising:

a generator column container having a bottom wall defining flow outlet aperture, an open top end, and a sidewall extending from the open top end to the bottom wall that defines an interior volume; and a closure cap assembly including:

a substantially cylindrical container cap having a top wall defining a flow inlet aperture and a substantially cylindrical sidewall extending downwardly therefrom, the container cap being configured to be slidably received in the open top end of the generator column container, an annular coupling groove defined by an inner surface of the sidewall of the container cap; and an elastomeric boot including an annular coupling ring, a body portion extending downwardly therefrom, and a substantially cylindrical base portion disposed at a bottom end of the body portion, wherein the annular coupling ring is disposed within the annular coupling groove.

16. The generator column assembly of claim 15, wherein the interior volume of the generator column container comprises a substantially cylindrical upper volume portion and a substantially cylindrical lower volume portion, the upper volume portion having a diameter that is greater than a diameter of the lower volume portion.

17. The generator column assembly of claim 16, further comprising an elutable media disposed within the upper volume portion of the generator column container and a filter media disposed within the lower volume portion of the general column container.

18. The generator column assembly of claim 17, wherein the base portion of the container cap assembly has a diameter that is substantially equal to the diameter of the upper volume portion of the generator column container.

19. The generator column assembly of claim 17, wherein the upper volume portion of the generator column container has a length-to-diameter ratio of approximately 0.5 to 0.9, a length of the upper volume portion being equal to a vertical length of the elutable media.

20. The generator column assembly of claim 19, wherein the lower volume portion of the generator column container has a length-to-diameter ratio of approximately 1.8 or greater, a length of the lower volume portion being equal to a vertical length of the filter media.

* * * * *